US008285289B2

(12) United States Patent
Mooney et al.

(10) Patent No.: US 8,285,289 B2
(45) Date of Patent: Oct. 9, 2012

(54) METHOD FOR TRIGGERING INTER-RAT IDLE HANDOFF

(75) Inventors: Christopher Francis Mooney, Livingston, NJ (US); David Albert Rossetti, Randolph, NJ (US); Jialin Zou, Randolph, NJ (US)

(73) Assignee: Alcatel Lucent, Paris (FR)

( * ) Notice: Subject to any disclaimer, the term of this patent is extended or adjusted under 35 U.S.C. 154(b) by 418 days.

(21) Appl. No.: 12/460,202

(22) Filed: Jul. 15, 2009

(65) Prior Publication Data

US 2010/0056150 A1    Mar. 4, 2010

Related U.S. Application Data

(60) Provisional application No. 61/134,962, filed on Jul. 15, 2008.

(51) Int. Cl.
*H04W 36/00* (2009.01)

(52) U.S. Cl. .................... 455/438; 455/443; 455/552.1; 455/432.1; 370/331

(58) Field of Classification Search .......... 455/436–444, 455/432.1, 552.1; 370/331–334
See application file for complete search history.

(56) References Cited

U.S. PATENT DOCUMENTS

2002/0160785 A1* 10/2002 Ovesjo et al. ................. 455/453
2005/0043046 A1*  2/2005 Lee .............................. 455/502

OTHER PUBLICATIONS

Ke-Chi Jang, Mohammed Khalil, Eric Parsons, Amir Saghir (eUTRAN to eHRPD Optimized Handoff, Jun. 16, 2008, Nortel.*

* cited by examiner

*Primary Examiner* — Vladimir Magloire
(74) *Attorney, Agent, or Firm* — Capitol Patent & Trademark Law Firm, PLLC

(57) ABSTRACT

A method for inter-RAT idle handoff is provided by transmitting a handoff initiation signal from a cell associated with a carrier for a first Radio Access Technology (RAT) area, the cell being located in an overlap coverage area with a second RAT area and adjacent to the second RAT area. Spatial hysteresis is provided by the new triggering method to eliminate the ping-pong issue when a mobile move along the border area. The invention also reduces network resource consumption due to ping-ponging.

16 Claims, 2 Drawing Sheets

Spatial Hysteresis

METHOD FOR TRIGGERING INTER-RAT IDLE HANDOFF

RELATED APPLICATIONS

This application claims priority pursuant to 35 U.S.C. Sec 119(e) to U.S. Provisional Application No. 61/134,962, filed Jul. 15, 2008, entitled "INTER-RAT IDLE HANDOFF TRIGGERING MESSAGES," the subject matter thereof being fully incorporated herein by reference.

FIELD OF THE INVENTION

The present invention generally relates to handoffs in wireless communication systems.

BACKGROUND OF THE INVENTION

If a mobile station is in an idle state and moves across different Radio Access Technologies (RATs) coverage areas, inter-RAT idle hand-off is conducted. The idle hand-off may include synchronizing the mobile station with the target carrier, measuring/reporting a pilot power of the target carrier, pre-checking in to the serving carrier, and pre-registration upon exiting a border area.

In a conventional system, the idle hand-off is normally triggered by a power measurement and the idle hand-off generally occurs at a sub-net boundary. If there are sharp boundaries between the subnets and a mobile station travels along a sub-net boundary area, a ping-pong issue occurs because the mobile may travel back and forth across the boundary which leads to unnecessary, frequent registrations at both sides of the sub-net. A conventional solution to the ping-pong issue is to use a hysteresis of the power measurement. However, the hysteresis of the power measurement may not be reliable due to shadowing and fading in a mobile environment. The hysteresis of the power measurement is also performed at the expense of power efficiency.

It is also known to introduce additional timer based hysteresis. However, such timer based hysteresis cannot prevent unnecessary idle handoffs if the timer setting is short especially for the access terminals that stay at the coverage border area. In other scenarios, timer-based hysteresis blocks necessary idle handoffs if the timer setting is too long, especially for the mobiles that move at high speed. It is very hard to determine an optimized timer value for mobiles with different speeds.

Another conventional method provides a secondary color code method which uses spatial hysteresis to resolve the ping-pong issue—i.e., base stations located at a border area of a particular subnet transmit both primary and secondary color codes. The primary color code is the color code associated with the subnet in which the base station or cell resides, whereas the secondary color code identifies the bordering subnet. The secondary color code method provides a more efficient method to resolve the ping-pong issue at the sub-net boundary, but only for intra-RAT idle hand-off—i.e., handoffs between systems operating at the same carrier frequency, and the secondary color code method introduces complexity on requesting cross sub-net paging. The secondary color code method only triggers a mobile to register and start the idle hand-off if the mobile exits the border area.

Distance-based hand-off triggering methods are used for both active and idle inter-RAT handoff. However, while such an approach is suitable for triggering active handoff it is too complicated for triggering the idle handoff. It has also been suggested that idle handoff activities be triggered when a mobile station, or access terminal (AT), exits a border area. A problem with this approach is the necessity of a dual mode AT to decode the overhead message from a target RAT (RAT2) when it is attached with a source RAT (RAT1), since the overhead message channel of the source RAT1 is often not reliable at its coverage edge. This approach will also increase the chance, or time gap, of a paging service interruption (i.e., the time gap between determination of a bad radio link with RAT1 (start of handoff) and completion of handoff to RAT2).

SUMMARY OF INVENTION

An embodiment of the present invention provides for an idle handoff for an access terminal (AT) triggered by a broadcast handoff indication at a first Radio Access Technology (RAT) coverage area from a node associated with the first RAT and located in an area of overlapping coverage with a second RAT coverage area. After the idle handoff triggering conditions are met, an idle handoff registration message will be sent out by the AT over the second RAT air link.

BRIEF DESCRIPTION OF THE FIGURES

The teachings of the present invention can be readily understood by considering the following detailed description in conjunction with the accompanying drawings, in which.

DETAILED DESCRIPTION

Figure 1:
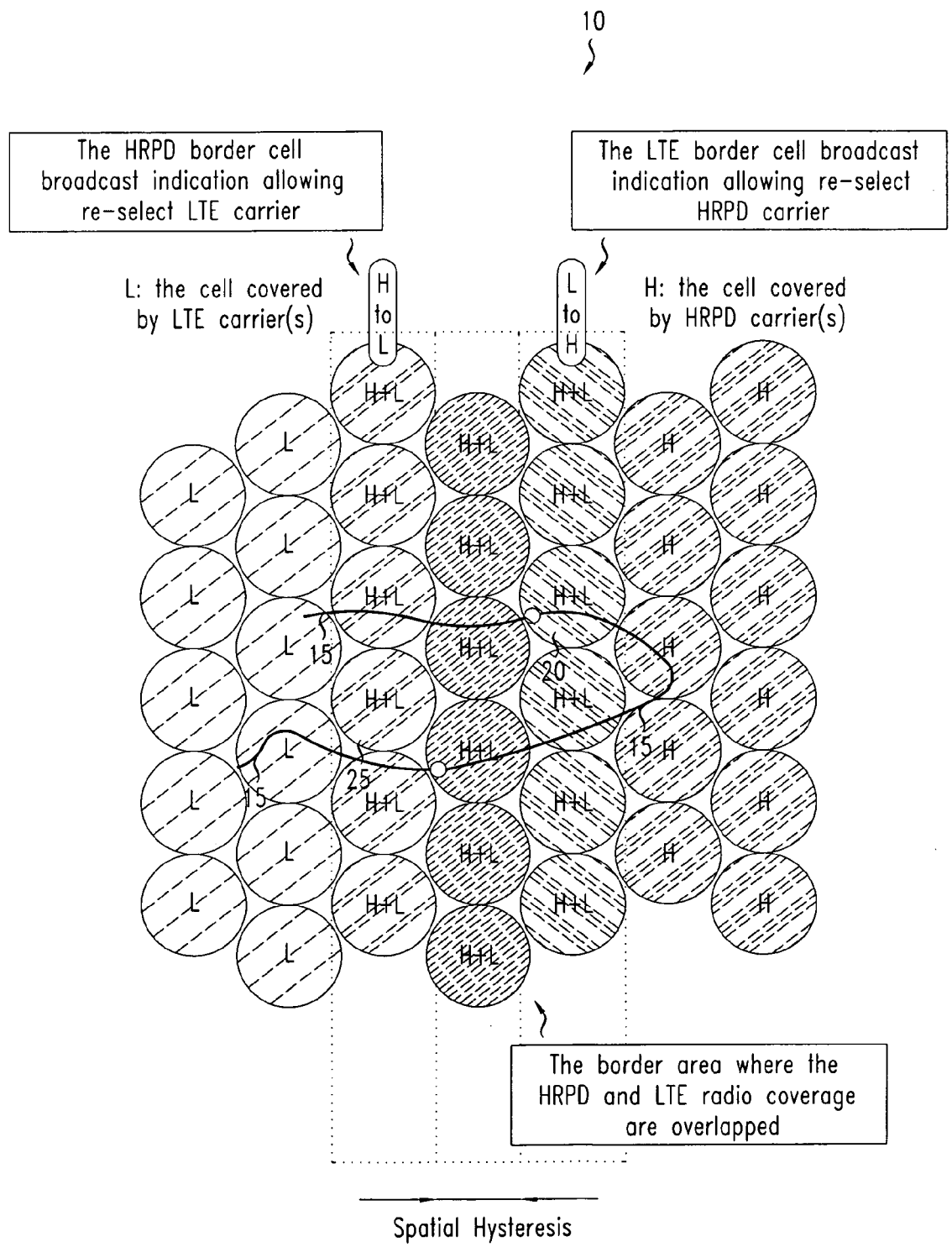
FIG. 1 schematically depicts a plurality of wireless cells configured to implement the methodology of the invention.

In the following description, for purposes of explanation and not limitation, specific details are set forth such as particular architectures, interfaces, techniques, etc., in order to provide a thorough understanding of illustrative embodiments of the invention. However, it will be apparent to those skilled in the art that the invention may be practiced in other illustrative embodiments that depart from these specific details. In some instances, detailed descriptions of well-known devices, circuits, and methods are omitted so as not to obscure the description of described embodiments with unnecessary detail. All principles, aspects, and embodiments, as well as specific examples thereof, are intended to encompass both structural and functional equivalents thereof. Additionally, it is intended that such equivalents include both currently known equivalents as well as equivalents developed in the future.

The invention is described hereafter in terms of inter-RAT handoff among a plurality of carriers having the first RAT type (generally designated type "L") and a plurality of carriers having the second RAT type (generally designated type "H"). Illustratively, the cells covered by RAT type L implement LTE (Long Term Evolution) protocols and carriers, and the cells covered by RAT type H implement HRPD (CDMA 2000 3G1X, High Rate Packet Data) protocols and carriers. Notationally, base stations and mobile stations in HRPD systems are referred to as access nodes (ANs) and access terminals (ATs), respectively, and base stations and mobile stations in LTE systems are referred to as evolved Node Bs (eNBs) and evolved User Equipments (eUEs), respectively. These terms will be used interchangeably herein with the generic base station and mobile station terms.

As described above, the existing solution for inter-RAT idle handoff is based on forward link (FL) power measurements with a timer based hysteresis mechanism, which do not fully resolve the ping-pong issues and will introduce paging service interruption. The switching back and forth at inter RAT radio links, will cause a race condition at the Local Mobility Anchor (LMA) and introduce un-necessary air link traffic. More specifically, if the radio-link ping-ponging occurs between RAT #1 and RAT #2 for an access terminal, the Proxy Binding Update (BU) from Media Access Gateway (MAG) #2 could be received before the BU from MAG #1. It is recognized that the LMA (i.e. PDN-GW) may incorrectly update the binding cache for a mobile node if messages are received out of order from the Media Access Gateways.

According to the methodology of the invention, a new handoff indication signal is broadcast at border cells of the source RAT for triggering inter-RAT idle handoff. Use of this new handoff indication signal for triggering inter-RAT handoff avoids problems described in the background associated with the purely spatial hysteresis approach for intra-RAT subnet idle handoff based on color codes broadcast by the target RAT. With broadcast of the handoff indication signal from predefined border cells associated with the source RAT, idle handoff is expected to occur at that border when the radio link with the source RAT is still good, the AT has already moved into the coverage edge cell of the source RAT and the target RAT radio link is good enough. It is noted that the method of the invention here will be applicable for both single and dual receiver dual mode ATs.

In the implementation of the invention methodology, the idle handoff indication will be broadcast at all the coverage edge cells of each RAT. With the invention methodology, no branched border concern will occur for inter-RAT case, and there will be no need to use color code approach.

For an exemplary embodiment of the invention, a 1-bit indication signal, having a meaning of, e.g., "idle handoff to LTE allowed," would be broadcast at the HRPD coverage edge cells. Similarly, a 1-bit indication meaning, e.g., "reselect HRPD allowed," would be broadcast at LTE edge cells or, alternatively, broadcast of a combination of existing LTE information (e.g. HRPDPreEstablishInd-0+HRPDPreReg-ZoneID). It should be understood, however, that neither the indication meaning nor the number of bits used to provide the indication signal are critical to the invention methodology, and the invention is intended to cover any indication signal broadcast by the border cell associated with the source RAT, as described herein.

Preferably, there should be enough coverage overlaps of the two different RATs to introduce the spatial hysteresis such that edge cells of different RATs should not be overlapped.

The invention may be implemented as make before break as there will be no need to have cross RAT paging.

In a further embodiment of the invention, a new AN configurable parameter, such as a quality measurement threshold, or an AT classification indication, will be applied at the ATs to be used for evaluation against AT classification criteria such as quality measurements at the AT on the target RAT. The AT classification value may be associated with an AT's preference or priority to reselect the target RAT or stay with the current serving RAT. For example, a high priority user could be attached more with the relatively more advanced RAT with its classification value determined at the AT or pre-configured accordingly. As should be apparent, a higher quality measurement threshold value makes an AT more difficult to re-select to the target RAT.

Further, with the invention methodology, when attached with the source RAT, the AT only needs to monitor the broadcast overhead message at the source RAT for idle handoff. Then, if both the idle handoff indication broadcast by the source RAT is asserted and the measurement by the AT of the target RAT is above the threshold (and only then), idle handoff activities are triggered at the AT. After idle handoff activities are triggered, the AT issues an InterRATMobilityIndication (IRMI) to request idle handoff to the target RAT, without bringing up a physical channel connection, and follows further idle handoff procedures as conventionally carried out.

As a further embodiment of the invention, and to eliminate a race condition at the LMA caused by radio link switches back and forth and the delay of the signaling delivery, a time stamp or sequence number may be embedded in the inter RAT idle handoff initiation message (i.e. IRMI). The IRMI handoff initiation signal with embedded time stamp will also operate to eliminate the race condition for active handoff. Preferably, the time stamp/sequence number information should be carried over other network interfaces in addition to the air interface (through air interface message, i.e. IRMI)

FIG. 1 illustrates a portion of a wireless cellular system in which an embodiment of the invention may be implemented. The wireless cellular system 10 may include a plurality of cells. Each of the cells may be covered by one or more Radio Access Technologies (RATs). For example, as shown in FIG. 1 a first portion of the cells may be covered by a carrier or carriers having a first RAT type L (the leftmost two columns of cells in figure), a second portion of the cells may be covered by a carrier or carriers having a second RAT type H (the rightmost two columns of cells in figure), and/or a third portion of the cells may be covered by both a carrier or carriers having the first RAT type L and a carrier or carriers having the second RAT type H (the three columns of cells in center of figure) representing the spatial hysteresis overlap area. The third portion of the cells may include entire cells and/or portions of cells, e.g., sectors, and/or may be referred to as a border area. Accordingly, the border area may be a cross technology border area. Illustratively, the cells covered by RAT type L implement LTE protocols and carriers, and the cells covered by RAT type H implement HRPD protocols and carriers.

Although embodiments of the invention may include a plurality of carriers having the first RAT type L and a plurality of carriers having the second RAT type H, an exemplary embodiment described herein will be described in relation to a wireless cellular system including a first carrier having the first RAT type L, a second carrier having the second RAT type H, and a border area including at least one sector covered by both the first carrier and the second carrier for ease of description.

Implementation of the methodology of the invention can be illustrated with reference to the track 15 of FIG. 1 depicting an AT moving from an L coverage area, through the border (joint) coverage area into an H coverage area, and ultimately returning, again via the border coverage area, to the L coverage area. Consider the movement of the AT along path 15 from the L coverage area, where it is camped, or attached, with a carrier of the L RAT. Upon reaching point A on path 15, representing entry to cell 20 located at the edge of the L to H border overlap, the AT receives an indication signal from cell 20 representing an instruction for idle handoff to the type H RAT system, ultimately completing that handoff to become attached to a carrier of the type H RAT. Then, as the AT continues to traverse path 15, it leaves the type H coverage area and reenters the border overlap area, ultimately arriving at cell 25 located at the edge of the H to L border overlap. At cell 25, the AT receives an indication signal from cell 25 representing an instruction for idle handoff to the type L RAT system, ultimately completing that handoff to become attached again to a carrier of the type L RAT According to the invention, the type L system will broadcast the hand-off initiation instruction at selected border cells in the overlap region adjacent to the type H coverage area. Similarly, the type H system will broadcast the handoff initiation instruction at selected border cells in the overlap region adjacent to the type L coverage area.

Figure 2:
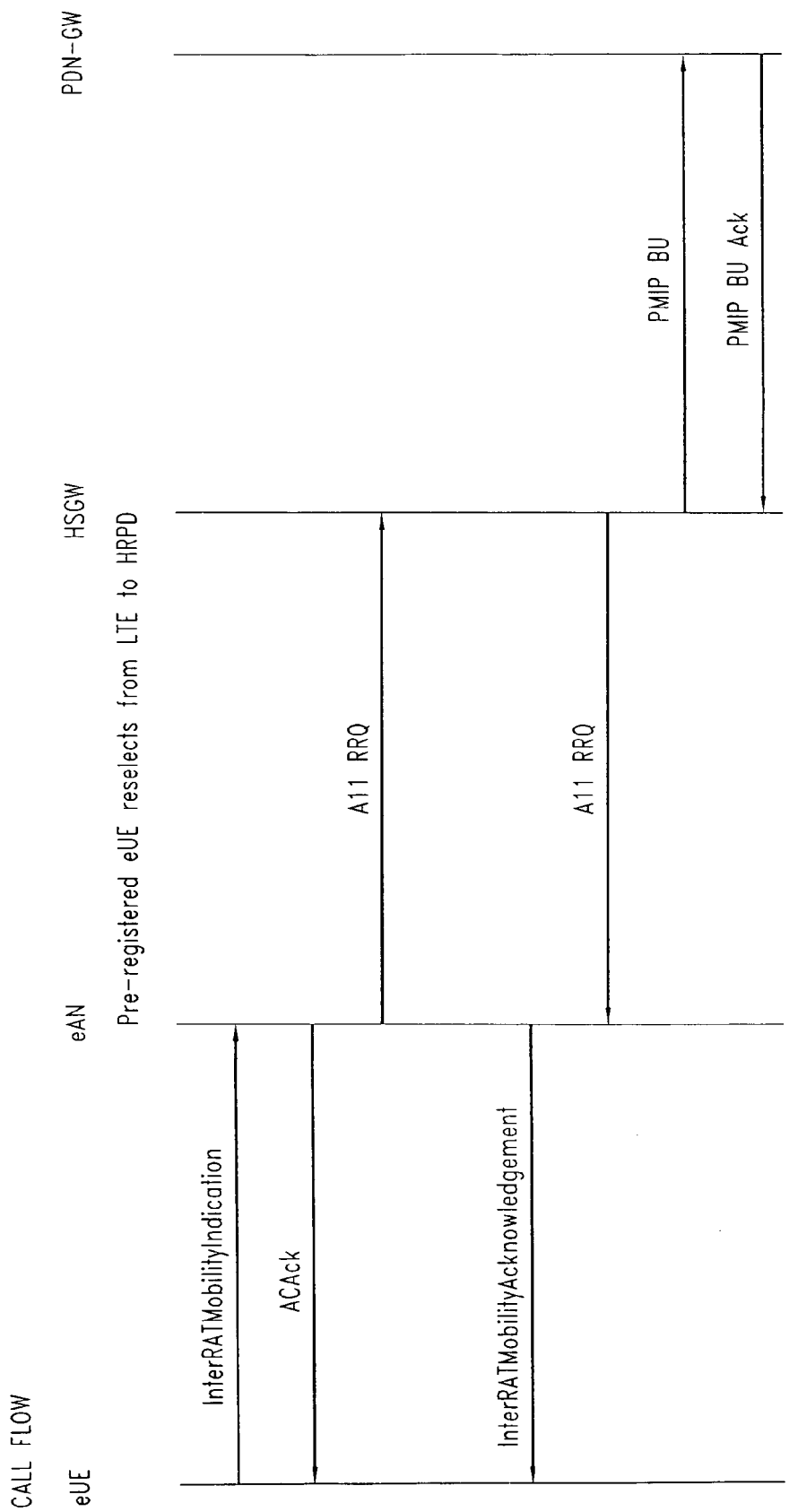
FIG. 2 shows a flow diagram for signaling messages in an illustrative invention embodiment.

Referring to FIG. 2, a procedure and signaling flow for an exemplary inter-RAT hand-off according to the invention methodology is described in detail below.

When an AT (or eUE) attached to LTE coverage is instructed by the broadcast overhead indication (from the source RAT system) that the AT is at the border cell of the LTE coverage and there are HRPD neighboring carriers available, the AT will camp on the target HRPD carrier and issue an IRMI message over the access channel of the HRPD radio link to the HRPD Access Node (or evolved Access Node (eAN)). The eAN will acknowledge the reception of the message with an ACAck message. Then the eAN will send an A11 RRQ (request) message to the HRPD Serving Gateway (HSGW) which conveys that the AT is now monitoring the HRPD AN and includes the information from the IRMI (timestamp or sequence number). After sending the A11 RRQ message to HSGW, the eAN will send an InterRATMobility-Acknowledgement message to the AT. Upon receiving the A11 RRQ message, the HSGW will send back an A11 RRP (reply) message. Upon receiving the A11 RRQ message, the HSGW will also send a Proxy Mobile IP (PMIP) Binding Update (BU) message to the Packet Data Network Gateway (PDN GW). Upon receiving the PMIP BU message, the PDN GW will send back an acknowledge message PMIP BU Ack to the HSGW. It should be noted that the signaling sequence indicated in FIG. 2 does not necessarily represent a time sequence. In particular, the transmission of the A11 RRP message could occur after transmission of the PMIP BU Ack message, and the transmission of the InterRATMobilityAcknowledgement could occur after transmission of the A11 RRP message.

Herein, the inventors have disclosed a method and system for providing improved inter-RAT handoff for idle mobile units in a wireless communication system. Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention and is not intended to illustrate all possible forms thereof. It is also understood that the words used are words of description, rather that limitation, and that details of the structure may be varied substantially without departing from the spirit of the invention, and that the exclusive use of all modifications which come within the scope of the appended claims is reserved.

The invention claimed is:

1. A method of triggering idle hand-offs at Radio Access Technology (RAT) borders in a wireless cellular system, comprising:
sending an idle hand-off indication signal to an access terminal attached to a first carrier of a first RAT type when the access terminal moves into an edge cell of a border coverage area that is covered by the first carrier and a second carrier of a second RAT type, wherein the edge cell is adjacent to a coverage area covered by the second carrier, and wherein the idle hand-off indication signal represents an instruction allowing an idle hand-off to the second carrier;
triggering the idle hand-off to the second carrier; and
after triggering the idle hand-off to the second carrier and upon the access terminal camping on the second carrier, receiving an Inter-RAT Mobility Indication (IRMI) message from the access terminal at an access node of the second carrier.

2. The method of claim 1, wherein the first carrier is a Long Term Evolution carrier and the second carrier is a High Rate Packet Data carrier.

3. The method of claim 1, wherein the first carrier is a High Rate Packet Data carrier and the second carrier is a Long Term Evolution carrier.

4. The method of claim 1, wherein the idle hand-off indication signal is a 1-bit signal.

5. The method of claim 1, comprising:
applying a quality measurement threshold against a quality measurement of the second carrier at the access terminal; and
triggering the idle hand-off to the second carrier at the access terminal only if the quality measurement of the second carrier is above the quality measurement threshold.

6. The method of claim 1, wherein the IRMI message includes an embedded time stamp or a sequence number.

7. The method of claim 1, wherein the IRMI message requests idle hand-off to the second carrier without bringing up a physical channel connection.

8. The method of claim 1, comprising:
acknowledging reception of the IRMI message at the access node;
sending a request message from the access node to a serving gateway of the second carrier, wherein the request message conveys that the access terminal is monitoring the access node;
upon receiving the request message at the serving gateway, sending a reply message from the serving gateway to the access node, and
sending a Proxy Mobile IP (PMIP) Binding Update (BU) message to a network gateway of the second carrier; and
upon receiving the PMIP BU message at the network gateway, sending an acknowledgement message from the network gateway to the serving gateway.

9. A wireless cellular system comprising:
a plurality of cells;
a first portion of the plurality cells in a first coverage area and covered by a first carrier, wherein the first carrier has a first Radio Access Technology (RAT) type;
a second portion of the plurality of cells in a second coverage area and covered by a second carrier, wherein the second carrier has a second RAT type;
a third portion of the plurality of cells in a third coverage area covered by both the first carrier and the second carrier;
at least one edge cell among the third portion of the plurality of cells that is located adjacent to the second coverage area; and
an access node for the second carrier,
wherein the system is configured to send an idle hand-off indication signal from the at least one edge cell to an access terminal that is attached to the first carrier and has entered into the edge cell,
wherein the idle hand-off indication signal represents an instruction allowing an idle hand-off to the second carrier,
wherein the system is configured to trigger the idle hand-off to the second carrier, and wherein the access node is configured to receive an Inter-RAT Mobility Indication (IRMI) message from the access terminal after the system triggers the idle hand-off to the second carrier and upon the access terminal camping on the second carrier.

10. The wireless cellular system of claim 9, wherein the first carrier is a Long Term Evolution carrier and the second carrier is a High Rate Packet Data carrier.

11. The wireless cellular system of claim 9, wherein the first carrier is a High Rate Packet Data carrier and the second carrier is a Long Term Evolution carrier.

12. The wireless cellular system of claim 9, wherein the idle hand-off indication signal is a 1-bit signal.

13. The wireless cellular system of claim 9, wherein the system is configured to:

apply a quality measurement threshold against a quality measurement of the second carrier at the access terminal; and trigger the idle hand-off to the second carrier at the access terminal only if the quality measurement of the second carrier is above the quality measurement threshold.

14. The wireless cellular system of claim 9, wherein the IRMI message includes an embedded time stamp or a sequence number.

15. The wireless cellular system of claim 9, wherein the IRMI message requests idle hand-off to the second carrier without bringing up a physical channel connection.

16. The wireless cellular system of claim 9, comprising:

a serving gateway for the second carrier; and a network gateway for the second carrier, wherein the access node is configured to acknowledge reception of the IRMI message and send a request message to the serving gateway, the request message conveying that the access terminal is monitoring the access node, wherein the serving gateway is configured to send a reply message to the access node and a Proxy Mobile IP (PMIP) Binding Update (BU) message to the network gateway upon receiving the request message, and wherein the network gateway is configured to send an acknowledgement message from the network gateway to the serving gateway upon receiving the PMIP BU message.

* * * * *